United States Patent
Omran et al.

(10) Patent No.: US 12,478,642 B1
(45) Date of Patent: Nov. 25, 2025

(54) METHOD OF TREATING CANCER USING CaV2O6/CASiO3/g-C3N4 NANOCOMPOSITE

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/263,736

(22) Filed: Jul. 9, 2025

(51) Int. Cl.
*A61K 39/395* (2006.01)
*A61K 33/44* (2006.01)

(52) U.S. Cl.
CPC .................................. *A61K 33/44* (2013.01)

(58) Field of Classification Search
None
See application file for complete search history.

(56) References Cited

U.S. PATENT DOCUMENTS

2020/0390804 A1  12/2020  Abduljauwad et al.

OTHER PUBLICATIONS

Pourmadadi et al. Two-Dimensional Graphitic Carbon Nitride (g-C3N4) Nanosheets and Their Derivatives for Diagnosis and Detection Applications. Journal of Functional Biomaterials, 1-24 (Year: 2022).*
Meher et al. "Formation of CaV2O6, CaSiO3 and CaMnO3 Salts During Thermo Chemical Leaching for Extraction of Alumina from Red Mud by Lime Soda Ash Sinter Process", British Journal of Applied Science & Technology 1(3): 41-52. (Year: 2011).*
Alaghmandfard et al. "A Comprehensive Review of Graphitic Carbon Nitride (g-C3N4)-Metal Oxide-Based Nanocomposites: Potential for Photocatalysis and Sensing" Nanomaterials, 12, 294 (1-73). (Year: 2022).*
Doudou Hu, et.al., "Vanadium-based nanomaterials for cancer diagnosis and treatment", Biomedical Materials, vol. 16, No. 1, Dec. 23, 2020, 014101, Abstract only, 5 pages.
Ikhazuagbe H. Ifijen, et.al., "A Review of Nanovanadium Compounds for Cancer Cell Therapy", TMS 2023 152nd Annual Meeting & Exhibition Supplemental Proceedings, Feb. 7, 2023, pp. 665-674, Abstract only, 2 pages.
Amin Masih, et.al., "Synthesis of Vanadium Graphitic-Carbon Nitride(v/g-$c_3n_4$) Composite for Biological Application", Journal of Medical & Health Sciences Review, vol. 2, No. 1, 2025, pp. 345-375.

* cited by examiner

*Primary Examiner* — Susan T Tran
(74) *Attorney, Agent, or Firm* — Oblon, McClelland, Maier & Neustadt, L.L.P.

(57) ABSTRACT

A method of treating a cancer by inducing apoptosis in a cancer cell includes contacting the cancer cell with a graphite-phase carbon nitride calcium metavanadate and calcium silicate ($CaV_2O_6/CaSiO_3/g\text{-}C_3N_4$) nanocomposite. The cancer cell is selected from at least one cancer cell line from the group consisting of a human hepatocellular carcinoma cell line and a human breast carcinoma cell line.

18 Claims, 4 Drawing Sheets ium square per gram ($m^2g^{-1}$).

METHOD OF TREATING CANCER USING CaV2O6/CASiO3/g-C3N4 NANOCOMPOSITE

BACKGROUND

Technical Field

The present disclosure is directed to a graphite-phase carbon nitride, calcium metavanadate, and calcium silicate ($CaV_2O_6$/$CaSiO_3$/$g-C_3N_4$) nanocomposite having anti-cancer properties.

Description of Related Art

The 'background' description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Cancer remains the leading cause of death and disability worldwide, primarily due to its complex and multifactorial nature. Conventional chemotherapy faces significant challenges, including low therapeutic indices, poor bioavailability, insolubility, non-specific targeting, and the development of multidrug resistance. These issues arise from factors such as overexpression of drug efflux transporters, anoxic tumor microenvironments, and dysregulated apoptotic pathways. To address these limitations, nanomaterials (NMs) have emerged as promising candidates in cancer therapy.

Nanomaterials offer several advantages, including enhanced targeting efficiency and prolonged circulation time, achieved through size, shape, and surface optimization. By encapsulating therapeutic agents or conjugating them with targeting ligands like transferrin, folic acid, or antibodies, NMs can deliver drugs specifically to cancer cells, tumor microenvironments, and the immune system. This targeted approach enhances therapeutic efficacy by enabling controlled release and reducing off-target effects. Despite these advancements, challenges remain in the clinical translation of nanomedicines, including issues related to manufacturing, regulatory approval, and potential toxicity.

Accordingly, one object of the present disclosure is to provide a method of treating cancer that may circumvent the above-listed drawbacks and limitations of the methods known in the art.

SUMMARY

In an exemplary embodiment, a method of inducing apoptosis in a cancer cell is described. The method includes contacting the cancer cell with a graphite-phase carbon nitride calcium metavanadate and calcium silicate ($CaV_2O_6$/$CaSiO_3$/$g-C_3N_4$) nanocomposite. The cancer cell is selected from at least one cancer cell line from the group consisting of a human hepatocellular carcinoma cell line and a human breast carcinoma cell line.

In some embodiments, the cancer cell is a MCF-7 cell. In another embodiments, the cancer cell is a HepG-2 cell.

In some embodiments, the method includes contacting the cancer cell with the $CaV_2O_6$/$CaSiO_3$/$g-C_3N_4$ nanocomposite at a final concentration of 3 micrograms per milliliter (µg/mL) or more.

In some embodiments, the $CaV_2O_6$/$CaSiO_3$/$g-C_3N_4$ nanocomposite has a half-maximal inhibitory concentration ($IC_{50}$) value of 123 µg/mL or less against the MCF-7 cell.

In some embodiments the cancer cell is a MCF-7 cell, and has a cell viability of 13% or less at a $CaV_2O_6$/$CaSiO_3$/$g-C_3N_4$ nanocomposite concentration of 450 to 550 µg/mL.

In some embodiments, the cancer cell is a MCF-7 cell, and has a cell viability of 30% or less at a $CaV_2O_6$/$CaSiO_3$/$g-C_3N_4$ nanocomposite concentration of 225 to 275 µg/mL.

In some embodiments, the cancer cell is a MCF-7 cell, and has a cell viability of 50% or less at a $CaV_2O_6$/$CaSiO_3$/$g-C_3N_4$ nanocomposite concentration of 110 to 140 µg/mL.

In some embodiments, the cancer cell is a MCF-7 cell, and has a cell viability of 70% or less at a $CaV_2O_6$/$CaSiO_3$/$g-C_3N_4$ nanocomposite concentration of 55 to 70 µg/mL.

In some embodiments, the cancer cell is a MCF-7 cell, and has a cell viability of 90% or less at a $CaV_2O_6$/$CaSiO_3$/$g-C_3N_4$ nanocomposite concentration of 25 to 40 µg/mL.

In some embodiments, the $CaV_2O_6$/$CaSiO_3$/$g-C_3N_4$ nanocomposite has a half-maximal inhibitory concentration ($IC_{50}$) value of 93 µg/mL or less against the HepG-2 cell.

In some embodiments, the cancer cell is a HepG-2 cell, and has a cell viability of 9% or less at a $CaV_2O_6$/$CaSiO_3$/$g-C_3N_4$ nanocomposite concentration of 450 to 550 µg/mL.

In some embodiments, the cancer cell is a HepG-2 cell, and has a cell viability of 25% or less at a $CaV_2O_6$/$CaSiO_3$/$g-C_3N_4$ nanocomposite concentration of 225 to 275 µg/mL.

In some embodiments, the cancer cell is a HepG-2 cell, and has a cell viability of 45% or less at a $CaV_2O_6$/$CaSiO_3$/$g-C_3N_4$ nanocomposite concentration of 110 to 140 µg/mL.

In some embodiments, the cancer cell is a HepG-2 cell, and has a cell viability of 60% or less at a $CaV_2O_6$/$CaSiO_3$/$g-C_3N_4$ nanocomposite concentration of 55 to 70 µg/mL.

In some embodiments, the cancer cell is a HepG-2 cell, and has a cell viability of 80% or less at a $CaV_2O_6$/$CaSiO_3$/$g-C_3N_4$ nanocomposite concentration of 25 to 40 µg/mL.

In some embodiments, the cancer cell is a HepG-2 cell, and has a cell viability of 90% or less at a $CaV_2O_6$/$CaSiO_3$/$g-C_3N_4$ nanocomposite concentration of 10 to 20 µg/mL.

In some embodiments, the contacting is at a temperature of 36 to 38° C. for 12 to 48 hours.

In some embodiments, the $CaV_2O_6$/$CaSiO_3$/$g-C_3N_4$ nanocomposite is in the form of porous particles having a pore volume of 0.18 to 0.26 cubic centimetre per gram ($cm^3g^{-1}$).

In some embodiments, the $CaV_2O_6$/$CaSiO_3$/$g-C_3N_4$ nanocomposite is in the form of porous particles having a Brunauer-Emmett-Teller (BET) surface area of 55 to 60 meter square per gram ($m^2g^{-1}$).

In another exemplary embodiment, the $CaV_2O_6$/$CaSiO_3$/$g-C_3N_4$ nanocomposite is synthesized in a process, including mixing a calcium salt and a metasilicate salt in a solvent to form silicate product. The process includes heating urea at 500 to 700° C. for 30 to 60 minutes to form $g-C_3N_4$ product. The process includes carbonization a metavanadate salt with xylose in an aqueous acid solution to form vanadate product. The process includes microwaving the silicate product, the $g-C_3N_4$ product, and the vanadate product in an organic solvent to form the $CaV_2O_6$/$CaSiO_3$/$g-C_3N_4$ nanocomposite.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
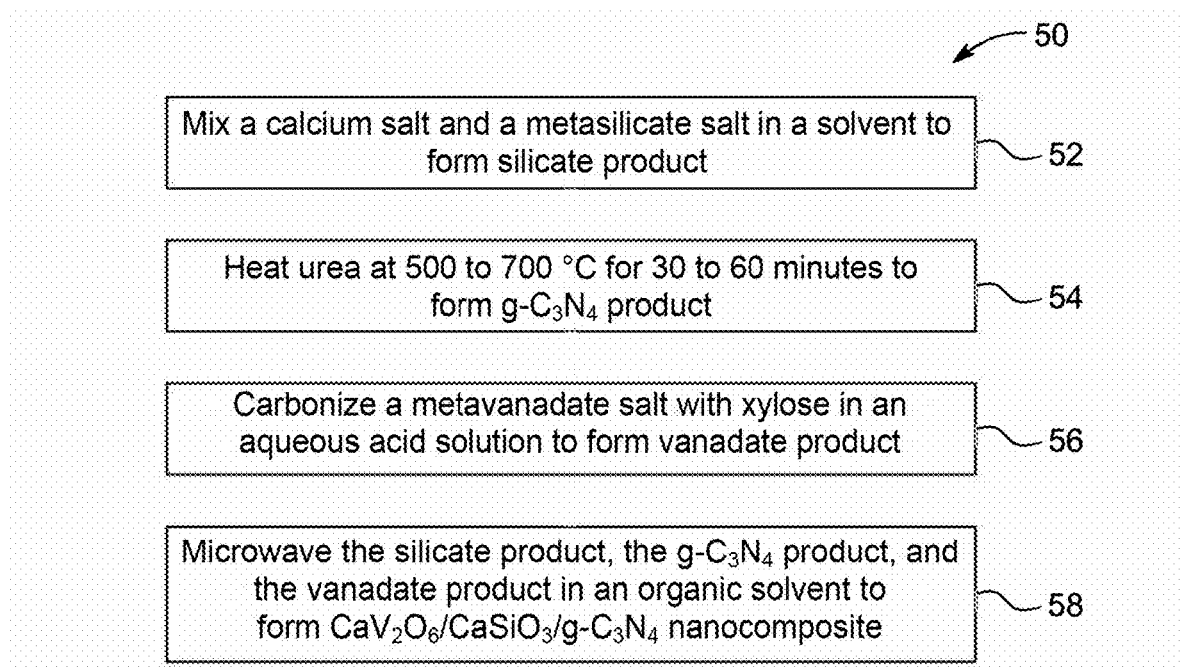
FIG. 1A is a schematic diagram of a flow chart of a method of synthesizing CaV$_2$O$_6$/CaSiO$_3$/g-C$_3$N$_4$ nanocomposite, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

When amounts, concentrations, dimensions, and other parameters are expressed in the form of a range, a preferable range, an upper limit value, a lower limit value, or preferable upper and limit values, it should be understood that any ranges obtainable by combining any upper limit or preferable value with any lower limit or preferable value are also specifically disclosed, irrespective of whether the obtained ranges are clearly mentioned in the context.

In this application, a numerical value interval (i.e., a numerical value range) is involved, and, if not specifically stated, an optional numerical value distribution is considered continuous within the numerical value interval and includes two numerical value endpoints (i.e., minimum and maximum values) of the numerical value range and each numerical value between the two numerical value endpoints.

The temperature parameters in the present application, if not specifically limited, are both allowed to be constant temperature processing and allowed to be varied within a certain temperature interval. The constant temperature processing allows the temperature to fluctuate within the precision range of the instrument control. It is allowed to fluctuate in the range of, for example, 5° C., 4° C., 3° C., 2° C., 1° C.

A weight percent of a component, unless specifically stated to the contrary, is based on the total weight of the formulation or composition in which the component is included. For example, if a particular element or component in a composition or article is said to have 5 weight percent (wt. %), it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{11}$C, $^{13}$C and $^{14}$C. Isotopes of oxygen include $^{16}$O, $^{17}$O, and $^{18}$O. Isotopes of nitrogen include $^{14}$N and $^{15}$N. Isotopes of Ca include $^{40}$Ca, $^{42}$Ca, $^{43}$Ca, $^{44}$Ca, $^{46}$Ca and $^{47}$Ca. Isotopes of silicon include $^{28}$Si, $^{29}$Si, $^{30}$Si and $^{32}$Si. Isotopes of hydrogen include $^1$H, $^2$H, and $^3$H. Isotopes of vanadium include $^{47}$V, $^{48}$V, $^{49}$V, $^{50}$V, and $^{51}$V. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term 'apoptosis' refers to the process of programmed cell death, an active process where cells dismantle themselves in a controlled manner, avoiding damage to surrounding cells. In this disclosure, the term 'apoptosis' preferably refers to the death of cells.

As used herein, the term 'cancer' refers to all types of cancer, neoplasm, or malignant tumors found in mammals (e.g., humans), including leukemias, lymphomas, carcinomas, and sarcomas. Exemplary cancers that may be treated with a compound or method provided herein include brain cancer, glioma, glioblastoma, neuroblastoma, prostate cancer, colorectal cancer, pancreatic cancer, Medulloblastoma, melanoma, cervical cancer, gastric cancer, ovarian cancer, lung cancer, cancer of the head, Hodgkin's Disease, and Non-Hodgkin's Lymphomas. Exemplary cancers that may be treated with a compound or method provided herein include cancer of the thyroid, endocrine system, brain, breast, cervix, colon, head & neck, liver, kidney, lung, ovary, pancreas, rectum, stomach, and uterus. Additional examples include, thyroid carcinoma, cholangiocarcinoma, pancreatic adenocarcinoma, skin cutaneous melanoma, colon adenocarcinoma, rectum adenocarcinoma, stomach adenocarcinoma, esophageal carcinoma, head and neck squamous cell carcinoma, breast invasive carcinoma, lung adenocarcinoma, lung squamous cell carcinoma, non-small cell lung carcinoma, mesothelioma, multiple myeloma, neuroblastoma, glioma, glioblastoma multiforme, ovarian cancer, rhabdomyosarcoma, primary thrombocytosis, primary macroglobulinemia, primary brain tumors, malignant pancreatic insulanoma, malignant carcinoid, urinary bladder cancer, premalignant skin lesions, testicular cancer, thyroid cancer, neuroblastoma, esophageal cancer, genitourinary tract cancer, malignant hypercalcemia, endometrial cancer, adrenal cortical cancer, neoplasms of the endocrine or exocrine pancreas, medullary thyroid cancer, medullary thyroid carcinoma, melanoma, colorectal cancer, papillary thyroid cancer, hepatocellular carcinoma, or prostate cancer.

As used herein, the term 'half maximal inhibitory concentration ($IC_{50}$)' refers to the measure of the potency of a substance in inhibiting a specific biological or biochemical function. $IC_{50}$ is a quantitative measure that indicates how much of a particular inhibitory substance (e.g., drug) is needed to inhibit, in vitro, a given biological process or biological component by 50%. The biological component can be an enzyme, cell, cell receptor, or microorganism. $IC_{50}$ values are typically expressed as molar concentration.

As used herein, the terms "treat", "treatment", and "treating" in the context of the administration of a therapy to a subject in need thereof refer to the reduction or inhibition of the progression and/or duration of a disease (e.g. cancer), the reduction or amelioration of the severity of the disease, and/or the amelioration of one or more symptoms thereof resulting from the administration of one or more therapies. "Treating" or "treatment" of the disease includes preventing the disease from occurring in a subject that may be predisposed to the disease but does not yet experience or exhibit symptoms of the disease (prophylactic treatment), inhibiting the disease (slowing or arresting its development), ameliorating the disease, providing relief from the symptoms or side-effects of the disease (including palliative treatment), and relieving the disease (causing regression of the disease). With regard to the disease, these terms simply mean that one or more of the symptoms of the disease will be reduced. Such teens may refer to one, two, three, or more results following the administration of one, two, three, or more therapies: (1) a stabilization, reduction (e.g. by more than 10%, 20%, 30%, 40%, 50%, preferably by more than 60% of the population of cancer cells and/or tumor size before administration), or elimination of The cancer cells, (2) inhibiting cancerous cell division and/or cancerous cell proliferation, (3) relieving to some extent (or, preferably, eliminating) one or more symptoms associated with, a pathology related to or caused in part by unregulated or aberrant cellular division, (4) an increase: in disease-free, relapse-free, progression-free, and/or overall survival, duration, or rate (5) a decrease in hospitalization rate, (6) a decrease in hospitalization length, (7) eradication, removal, or control of primary, regional and/or metastatic cancer, (8) a stabilization or reduction (e.g. by at least 10%, 20%, 30%, 40%, 50%, 60%, 70%, preferably at least 80% relative to the initial growth rate) in the growth of a tumor or neoplasm, (9) an impairment in the formation of a tumor, (10) a reduction in mortality, (11) an increase in the response rate, the durability of response, or number of patients who respond or are in remission, (12) the size of the tumor is maintained and does not increase or increases by less than 10%, preferably less than preferably less than 4%, preferably less than 2%, (13) a decrease in the need for surgery (e.g. colectomy, mastectomy), and (14) preventing or reducing (e.g. by more than 10%, more than 30%, preferably by more than 60% of the population of metastasized cancer cells before administration) the metastasis of cancer cells.

As used herein, the term 'human breast carcinoma (MCF-7) cells' refers to a human epithelial cell line derived from breast adenocarcinoma, commonly used in cancer research to evaluate the cytotoxic or antiproliferative activity of pharmaceutical compounds and nanomaterials.

As used herein, the term 'antiproliferation agent' refers to a compound or material that inhibits or prevents the proliferation (growth and reproduction) of cells, particularly cancerous or abnormal cells. The antiproliferative effect is achieved through various mechanisms, such as interference with cell cycle progression, induction of apoptosis (programmed cell death), inhibition of DNA/RNA synthesis, or disruption of metabolic pathways essential for cell growth. Antiproliferation agents are generally used in therapeutic applications to target and control the uncontrolled cell division characteristic of cancer and other proliferative disorders.

As used herein, the term 'human hepatocellular carcinoma (HepG-2) cells' refers to a well-differentiated human liver cancer cell line derived from a hepatocellular carcinoma, widely employed as an in vitro model for liver function studies, drug metabolism, and cytotoxicity testing.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nm to 500 nanometers (nm). The NPs may exist in various morphological shapes, such as nanotubes, nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, mixtures thereof, and the like.

As used herein, the term 'nanocomposites' refers to a material composed of two or more distinct components, at least one of which has a nanoscale structure, typically in the range of 1 to 100 nm. These components are combined to form a composite material that exhibits properties, such as increased strength, electrical conductivity, chemical reactivity, and/or thermal stability, compared to the individual components. Nanocomposites may be poly-phase solid materials made up of two or more nanomaterials. The term includes all types of multiphase solid material in which one of the phases has one, two, or three dimensions of less than 100 nm, or structures having nanoscale repeat distances between the different phases that make up the material. The definition within the scope of the disclosure includes porous media, colloids, gels, copolymers, and solid combination of a bulk matrix and nanodimensional phase(s) differing in properties due to dissimilarities in structure and chemistry. The nanocomposites morphologies that are generally prepared include phase separated systems, intercalated systems, and exfoliated systems. The nanocomposites include ceramic matrix nanocomposites (CMNC), polymer matrix nanocomposites (PMNC), metal matrix nanocomposites (MMNC), and/or any combination thereof. Nanocomposites may be used in various applications, including catalysis, environmental remediation, electronics, and materials science.

As used herein, the term 'pore diameter' refers to an average width or size of the pores (void spaces) within a material, typically measured in nm or angstroms (Å). It is a key parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is an important parameter in characterizing the porous structure of materials, such as adsorbents or catalysts.

As used herein, the term 'amount' refers to the proportion or presence of a particular substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), or mole fraction.

A wt. % of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

Aspects of the present disclosure are directed to a method of treating cancer cells using a nanocomposite material including calcium metavanadate ($CaV_2O_6$), calcium silicate ($CaSiO_3$), and graphitic-phase carbon nitride ($g-C_3N_4$).

In the present disclosure, a method of inducing apoptosis in a cancer cell is described. The cancer cell is selected from at least one cancer cell line from the group consisting of a human hepatocellular carcinoma cell line and a human breast carcinoma cell line. The method includes contacting the cancer cells with a graphite-phase carbon nitride calcium metavanadate and calcium silicate ($CaV_2O_6/CaSiO_3/g-C_3N_4$) nanocomposite. The method further includes contacting the cancer cell with the $CaV_2O_6/CaSiO_3/g-C_3N_4$ nanocomposite at a final concentration of 3 micrograms per milliliters (μg/mL) or more. In some embodiments, the contacting may include the $CaV_2O_6/CaSiO_3/g-C_3N_4$ nanocomposite in a form of suspension, mixing slurry, clear solution, emulsion and/or solid. In a preferred embodiment, the $CaV_2O_6/CaSiO_3/g-C_3N_4$ nanocomposite is in a form of a clear solution.

In some embodiments, the contacting occurs for a period of 12 to 48 hours, preferably 12 to 36 hours, preferably 14 to 34 hours, preferably 16 to 32 hours, preferably 18 to 30 hours, preferably 20 to 28 hours, preferably 22 to 26 hours, preferably 24 hours. In some embodiments, the contacting is at a temperature of 36 to 38° C., preferably 36.2 to 37.8° C., preferably 36.4 to 37.6° C., preferably 36.6 to 37.4° C., preferably 36.8 to 37.2° C., preferably 37.0° C.

In some embodiments, the $CaV_2O_6/CaSiO_3/g-C_3N_4$ nanocomposite has a half-maximal inhibitory concentration ($IC_{50}$) value of 50 to 150 μg/mL against the cancer cells, preferably 60 to 140 μg/mL, preferably 70 to 130 μg/mL, preferably 80 to 123 μg/mL, preferably 90 to 123 μg/mL, preferably 90 to 100 μg/mL, preferably 90 to 95 μg/mL, preferably 110 to 125 μg/mL, preferably 120 to 125 μg/mL, preferably 123 μg/mL, preferably 93 μg/mL.

In some embodiments, the cancel cell has a cell viability of 90% or less after contacting the $CaV_2O_6/CaSiO_3/g-C_3N_4$ nanocomposite, preferably 5% to 90%, preferably 10% to 90%, preferably 12% to 90%.

In some embodiments, the $CaV_2O_6/CaSiO_3/g-C_3N_4$ nanocomposite has a half-maximal inhibitory concentration ($IC_{50}$) value of 110 to 125 μg/mL against the MCF-7 cancer cells, preferably 120 to 125 μg/mL, preferably 122 to 124 μg/mL, preferably 122.92 μg/mL. In some embodiments, the cancer cell is a MCF-7 cell, and has a cell viability of 13% or less, preferably 10% to 13%, preferably 11% to 13%, preferably 12% to 13%, at a $CaV_2O_6/CaSiO_3/g-C_3N_4$ nanocomposite concentration of 450 to 550 μg/mL, preferably 500 μg/mL. In some embodiments, the cancer cell is a MCF-7 cell, and has a cell viability of 30% or less, preferably 20% to 30%, preferably 22% to 28%, preferably 24% to 26%, at a $CaV_2O_6/CaSiO_3/g-C_3N_4$ nanocomposite concentration of 225 to 275 μg/mL, preferably 250 μg/mL. In some embodiments, the cancer cell is a MCF-7 cell, and has a cell viability of 50% or less, preferably 40% to 48%, preferably 42% to 47%, preferably 44% to 47%, at a $CaV_2O_6/CaSiO_3/g-C_3N_4$ nanocomposite concentration of 110 to 140 μg/mL, preferably 125 μg/mL. In some embodiments, the cancer cell is a MCF-7 cell, and has a cell viability of 70% or less, preferably 60% to 70%, preferably 65% to 69%, preferably 66% to 68%, at a $CaV_2O_6/CaSiO_3/g-C_3N_4$ nanocomposite concentration of 55 to 70 μg/mL, preferably 62.5 μg/mL. In some embodiments, the cancer cell is a MCF-7 cell, and has a cell viability of 90% or less, preferably 80% to 89%, preferably 82% to 87%, preferably 84% to 86%, at a $CaV_2O_6/CaSiO_3/g-C_3N_4$ nanocomposite concentration of 25 to 40 μg/mL preferably 31.25 μg/mL.

In some embodiments, the $CaV_2O_6/CaSiO_3/g-C_3N_4$ nanocomposite has a half-maximal inhibitory concentration ($IC_{50}$) value of 90 to 100 μg/mL or less against the HepG-2 cell, preferably 90 to 95 μg/mL, preferably 92 to 94 μg/mL, preferable 93 μg/mL. In some embodiments, the cancer cell is a HepG-2 cell, and has a cell viability of 9% or less, preferably 5% to 9%, preferably 7% to 9%, preferably 9%, at a $CaV_2O_6/CaSiO_3/g-C_3N_4$ nanocomposite concentration of 450 to 550 μg/mL, preferably 500 μg/mL. In some embodiments, the cancer cell is a HepG-2 cell, and has a cell viability of 25% or less, preferably 20% to 25%, preferably 22% to 25%, at a $CaV_2O_6/CaSiO_3/g-C_3N_4$ nanocomposite concentration of 225 to 275 μg/mL, preferably 250 μg/mL. In some embodiments, the cancer cell is a HepG-2 cell, and has a cell viability of 45% or less, preferably 40% to 45%, preferably 41% to 44%, preferable 42% to 43%, at a $CaV_2O_6/CaSiO_3/g-C_3N_4$ nanocomposite concentration of 110 to 140 μg/mL, preferably 125 μg/mL. In some embodiments, wherein the cancer cell is a HepG-2 cell, and has a cell viability of 60% or less, preferably 50% to 60%, preferably 55% to 59%, preferably 57% to 58%, at a $CaV_2O_6/CaSiO_3/g-C_3N_4$ nanocomposite concentration of 55 to 70 μg/mL, preferably 62.5 μg/mL. In some embodiments, the cancer cell is a HepG-2 cell, and has a cell viability of 80% or less, preferably 70% to 80%, preferably 71% to 78%, preferably 72% to 75%, at a $CaV_2O_6/CaSiO_3/g-C_3N_4$ nanocomposite concentration of 25 to 40 μg/mL, preferably 31.25 μg/mL. In some embodiments, the cancer cell is a HepG-2 cell, and has a cell viability of 90% or less, preferably 80% to 90%, preferably 85% to 90%, preferably 88% to 89%, at a $CaV_2O_6/CaSiO_3/g-C_3N_4$ nanocomposite concentration of 10 to 20 μg/mL, preferably 15.6 μg/mL.

In some embodiments, the $CaV_2O_6/CaSiO_3/g-C_3N_4$ nanocomposite is in the form of porous particles having a pore volume of 0.18 to 0.26 cubic centimeter per gram ($cm^3g^{-1}$), preferably 0.19 to 0.25 $cm^3g^{-1}$, preferably 0.20 to 0.24 $cm^3g^{-1}$, preferably 0.21 to 0.23 $cm^3g^{-1}$, preferably 0.22 $cm^3g^{-1}$. In some embodiments, the $CaV_2O_6/CaSiO_3/g-C_3N_4$ nanocomposite is in the form of porous particles having a Brunauer-Emmett-Teller (BET) surface area of 55 to 60 meter square per gram ($m^2g^{-1}$), preferably 56 to 59 $m^2g^{-1}$, preferably 57 to 58 $m^2g^{-1}$, preferably 57.02 $m^2g^{-1}$.

FIG. 1A illustrates a flow chart of a process 50 for making the $CaV_2O_6/CaSiO_3/g-C_3N_4$ nanocomposite. The order in which the process 50 is described is not intended to be construed as a limitation, and any number of the described process steps can be combined in any order to implement the process 50. Additionally, individual steps may be removed or skipped from the process 50 without departing from the spirit and scope of the present disclosure.

At step 52, the process 50 includes including mixing a calcium salt and a metasilicate salt in a solvent to form a silicate product. In some embodiments, calcium salt may include but is not limited to calcium chloride, calcium sulfate, calcium carbonate, calcium phosphate, calcium acetate, calcium citrate, calcium lactate, calcium gluconate, calcium formate, calcium oxalate, calcium tartrate, calcium ascorbate, calcium benzoate, calcium propionate, calcium stearate, calcium hydroxide, calcium peroxide, calcium iodate, calcium molybdate, calcium hypochlorite, calcium thiocyanate, calcium chromate, calcium ferrite, calcium bromide, calcium fluoride, calcium sulfide, calcium arsenate, calcium tungstate, calcium borate, calcium perchlorate, and calcium hydride. In a preferred embodiment, calcium salt is calcium nitrate.

In some embodiments, the metasilicate salt may include, but are not limited to, sodium metasilicate, potassium metasilicate, calcium metasilicate, magnesium metasilicate, lithium metasilicate, barium metasilicate, strontium metasilicate, zinc metasilicate, copper (II) metasilicate, silver metasilicate, cadmium metasilicate, manganese (II) metasilicate, aluminum metasilicate, antimony (V) metasilicate, bismuth (V) metasilicate, gallium (III) metasilicate, zirconium (IV) metasilicate, and ruthenium (IV) metasilicate. In a preferred embodiment, the metasilicate salt is sodium metasilicate.

In some embodiments, the solvent may include but are not limited to water, methanol, ethanol, propanol, isopropanol, butanol, isobutanol, sec-butanol, tert-butanol, pentanol, hexanol, heptanol, octanol, nonanol, decanol, formic acid, acetic acid, propionic acid, butyric acid, lactic acid, glycolic acid, glycerol, ethylene glycol, propylene glycol, diethylene glycol, triethylene glycol, 1,2-butanediol, 1,3-butanediol, 1,2-pentanediol, and 1,3-propanediol. In a preferred embodiment, solvent is ethanol.

At step 54, the process 50 includes heating urea at 500 to 700° C., preferably 504 to 696° C., preferably 506 to 694° C., preferably 508 to 692° C., preferably 510 to 690° C., preferably 512 to 688° C., preferably 514 to 686° C., preferably 516 to 684° C., preferably 518 to 682° C., preferably 520 to 680° C., preferably 522 to 678° C., preferably 524 to 676° C., preferably 526 to 674° C., preferably 528 to 672° C., preferably 530 to 670° C., preferably 532 to 668° C., preferably 534 to 666° C., preferably 536 to 664° C., preferably 538 to 662° C., preferably 540 to 660° C., preferably 542 to 658° C., preferably 544 to 656° C., preferably 546 to 654° C., preferably 548 to 652° C., preferably 650° C. for 30 to 60 minutes, preferably 32 to 58 minutes, preferably 34 to 56 minutes, preferably 36 to 54 minutes, preferably 38 to 52 minutes, preferably 40 to 50 minutes, preferably 42 to 48 minutes, preferably 44 to 46 minutes, preferably 45 minutes to form g-$C_3N_4$ product. The heating of urea can be done by using heating appliances such as hot plates, heating mantles ovens, microwaves, autoclaves, tapes, oil baths, salt baths, sand baths, air baths, hot-tube furnaces, and hot-air guns. In a preferred embodiment, the heating appliance is a furnace.

At step 56, the process 50 includes carbonizing a metavanadate salt with xylose in an aqueous acid solution to form vanadate product. In some embodiments, the aqueous acid solution may include acid selected from the group consisting of hydrochloric acid (HCl), sulfuric acid ($H_2SO_4$), perchloric acid ($HClO_4$), boric acid ($H_3BO_3$), and nitric acid ($HNO_3$). In some embodiments, the acid may include, but is not limited to, phosphoric acid, hydrofluoric acid, hydrobromic acid, hydroiodic acid, perchloric acid, chloric acid, bromic acid, iodic acid, selenic acid, telluric acid, carbonic acid, silicic acid, boric acid, chromic acid, manganic acid, periodic acid, arsenic acid, antimonic acid, stannic acid, phosphorous acid, hypophosphorous acid, hypochlorous acid, chlorous acid, hypobromous acid, bromous acid, hypoiodous acid, iodous acid, perbromic acid, periodic acid, carbonic acid. The aqueous acid solution is $HNO_3$.

At step 58, the process 50 includes microwaving the silicate product, the g-$C_3N_4$ product, and the vanadate product in an organic solvent to form the $CaV_2O_6$/$CaSiO_3$/g-$C_3N_4$ nanocomposite. In some embodiments, the organic solvent is at least one selected from the group consisting of methanol, ethanol, and propanol. In some embodiments, the organic solvent may include, but is not limited to, tetrahydrofuran, ethyl acetate, dimethylformamide, acetonitrile, acetone, dichloromethane, toluene, dimethyl sulfoxide, nitromethane, propylene carbonate, ethanol, formic acid, n-butanol, methanol, or any combination thereof. In a preferred embodiment, the organic solvent is ethanol.

EXAMPLES

The following examples demonstrate a method of inducing apoptosis in a cancer cell as described herein. The examples are provided solely for illustration and are not to be construed as limitations of the present disclosure, as many variations thereof are possible without departing from the spirit and scope of the present disclosure.

Example 1: Fabricating $CaSiO_3$

Equal moles of calcium nitrate and sodium metasilicate were dispersed in 100 milliliters (mL) of ethanol:water (1:1) in a 150 mL glass beaker and sonicated for 15 min. The mixture was transferred to a 200 mL autoclave and then placed in an oven operated at 180° C. for 2.0 h. The product was dispersed in 500 mL distilled water with an ultrasonic bath for 10 minutes, filtered via a Buchner system, rinsed with distilled water, and dried at 120° C. for 1.0 h.

About 30.0 g of urea was placed in a 250 mL porcelain crucible, covered with its porcelain cover, then the hall crucible and cover were raped with three layers of aluminum foil to reduce the urea loss of evaporation. The crucible was heated via a furnace set at 600° C. for 45 min.

About 10.0 ammonium metavanadate and 10.0 grams (g) of xylose were placed in a 500 mL beaker. 100 ml distilled water was added to the mixture and heated till a clear solution was obtained. 10 mL of concentrated nitric acid was added to the mixture, which was then heated till the carbonization of xylose. The mixture was placed in an oven set at 120° C. for 5.0 h; the black product was milled in a mortar, placed in a 150 mL porcelain dish, and calcined at 550° C. for 3.0 h.

An equal mass of $CaSiO_3$, g-$C_3N_4$, and $V_2O_5$ was transferred to a mono wave-200 vial (G30), dispersed in 20 mL ethylene glycol monomethyl ether via an ultrasonic bath for 30 minutes. The vial was closed with its Teflon cover and placed in the Anton-Baar Monowave-200 operated at 180° C. and 5.0 bar pressure for one hour. The product was dispersed in 1 liter (L) distilled water with an ultrasonic bath for 30 minutes, filtered via a Buchner system, rinsed with distilled water, and dried at 150° C. for 2.0 h.

Figure 1B:
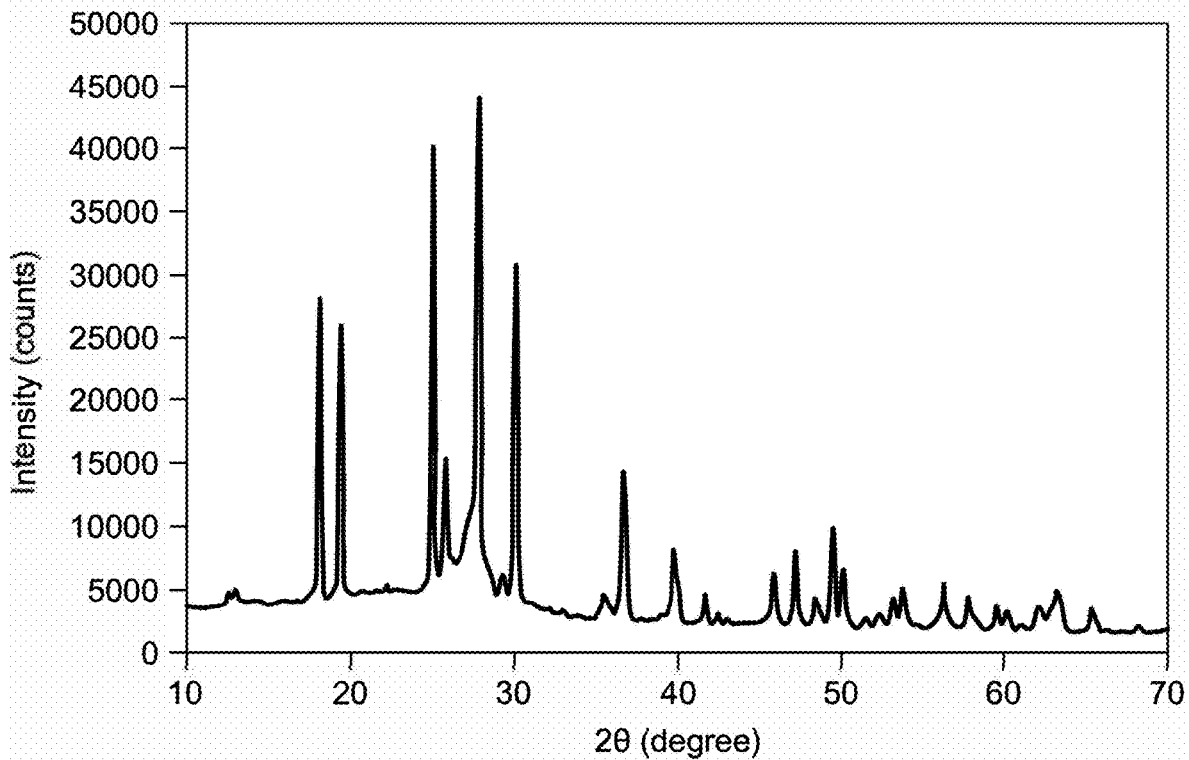
FIG. 1B is an X-ray diffraction (XRD) diffractogram of CaV$_2$O$_6$/CaSiO$_3$/g-C$_3$N$_4$ nanocomposite, according to certain embodiments.

The crystallinity and phases identification present in $CaV_2O_6$/$CaSiO_3$/g-$C_3N_4$ catalyst was analyzed by X-ray diffraction (XRD) and the results are given in FIG. 1B. The intense peaks and high intensity values indicate that the powder is highly crystalline in nature. Examination of the diffraction patterns with the standard powder diffraction file (PDF) cards reveals the presence of $CaV_2O_6$ as major phase together with $CaSiO_3$, and g-$C_3N_4$ as minor phases. The $CaV_2O_6$ phase was indexed to the 2θ values of 25.1, 25.9, 27.8, 27.9, 30.1, 36.8, 36.9, 39.7, and 49.6°. These diffractions are, respectively, assigned to (201), (100), (−202), (−111), (111), (−311), (400), (003) and (020) plans of the monoclinic phase of $CaV_2O_6$ (Reference code No. 01-073-0186). The $CaSiO_3$ phase (COD No. 01-072-2284) was detected at 2θ values of 25.2, 30.2, and 41.8°. These diffractions were respectively coming from (002), (120), and (−231). The diffractions related to g-$C_3N_4$ were observed at 45.8, 53.7, 71.8 and 79.4° (COD No. 1534042). Minor traces of $SiO_2$ were detected at 2θ value of 19.3° and 25.1° (Reference code No. 00-049-0629). No other phases were detected indicating the successful fabrication of $CaV_2O_6$/$CaSiO_3$/g-$C_3N_4$.

Figure 2A:
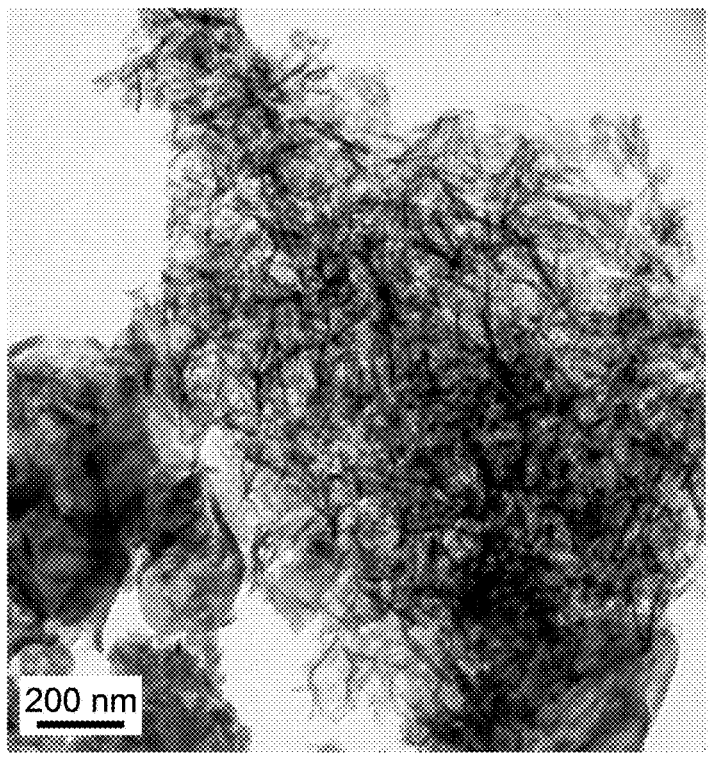
FIG. 2A is a transmission electron microscopy (TEM) image of CaV$_2$O$_6$/CaSiO$_3$/g-C$_3$N$_4$ nanocomposite, according to certain embodiments.
Figure 2B:
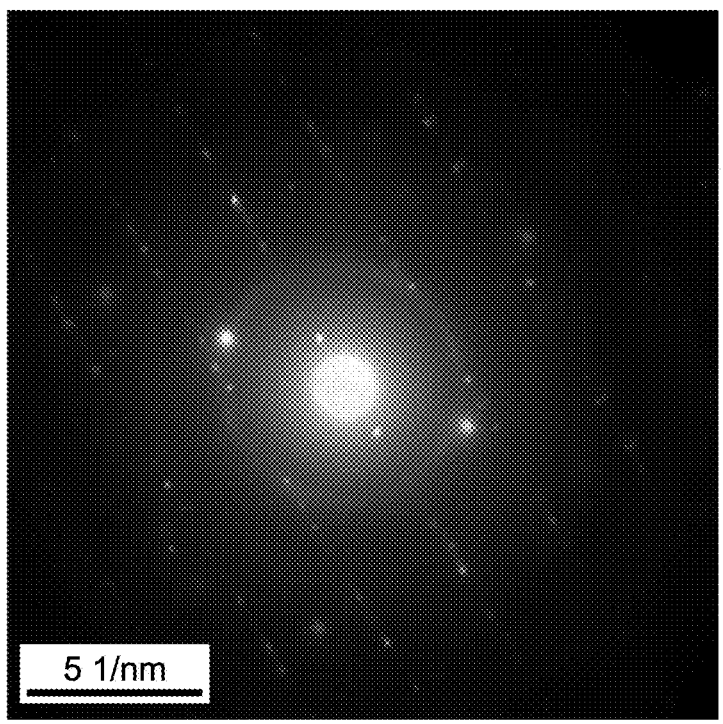
FIG. 2B is a selected area electron diffraction (SAED) image of CaV$_2$O$_6$/CaSiO$_3$/g-C$_3$N$_4$ nanocomposite, according to certain embodiments.

Transmission electron microscopy (TEM) image of $CaV_2O_6$/$CaSiO_3$/g-$C_3N_4$ nanocomposite was presented in FIG. 2A. The TEM images showed that two-dimensional (2D) porous structure constructed with curled and wrinkled nanosheets and platelets of the g-$C_3N_4$ (FIG. 2A). The image shows also well dispersion of homogeneous nanowires of metal oxides with average length of 90.6 nanometers (nm) on nanosheets of g-$C_3N_4$. The corresponding selected area electron diffraction (SAED) pattern (FIG. 2B) reveals diffraction spots with interplanar spacing of 0.23 nm, 0.219 nm, 0.17, and 0.146 nm due to (003, $CaV_2O_6$, (−231, $CaSiO_3$) and (003, $CaV_2O_6$), diffraction planes, respectively as confirmed from XRD data.

Figure 3A:
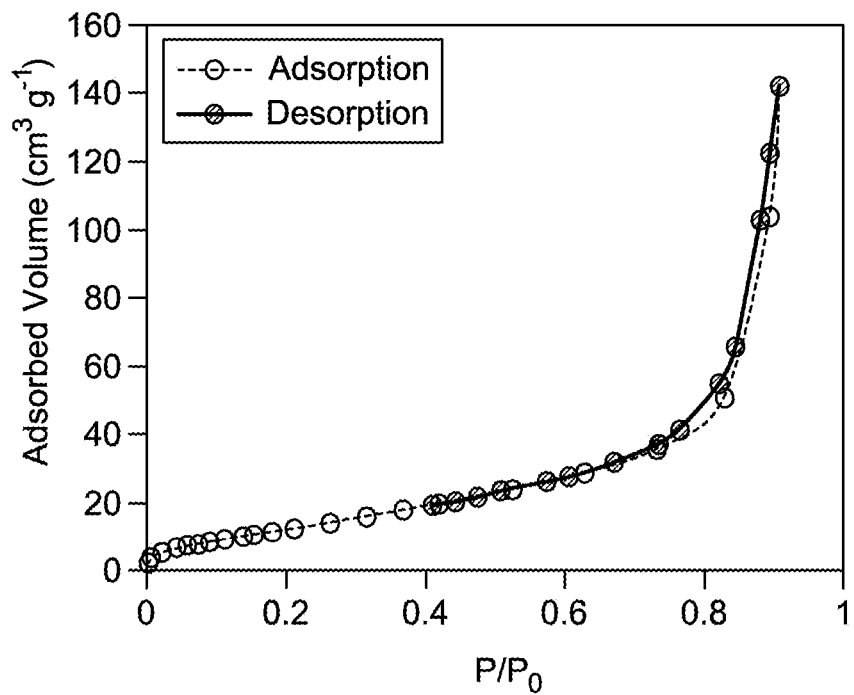
FIG. 3A is a N$_2$ adsorption-desorption isotherm of CaV$_2$O$_6$/CaSiO$_3$/g-C$_3$N$_4$ nanocomposite, according to certain embodiments.
Figure 3B:
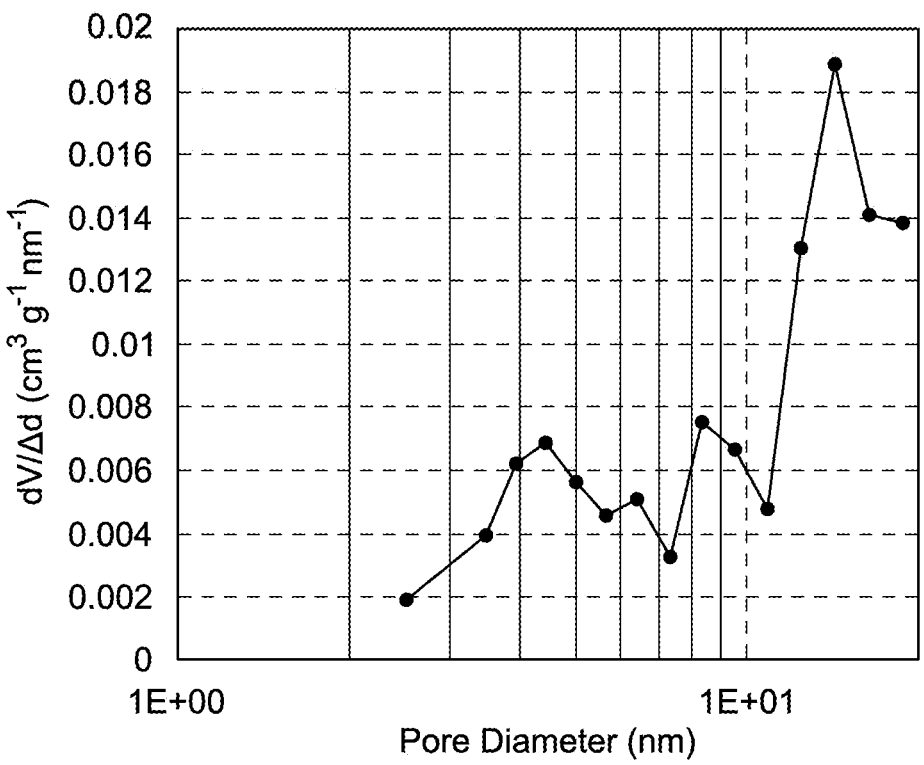
FIG. 3B depicts corresponding pore size distribution of CaV$_2$O$_6$/CaSiO$_3$/g-C$_3$N$_4$ nanocomposite, according to certain embodiments.

FIG. 3A displays the nitrogen adsorption-desorption isotherms of $CaV_2O_6$/$CaSiO_3$/g-$C_3N_4$ nanocomposite. The nitrogen sorption isotherm of the composite belongs to type IV with narrow hysteresis loop, indicating the formation of mesoporous structures. However, shifting the loop to a relatively higher pressure (P/PO=0.73-1) indicates the presence of wide mesopores, which may result from the deposition of metal oxides particles in the wide pores of g-$C_3N_4$. Furthermore, the Brunauer-Emmett-Teller (BET) surface area of the $CaV_2O_6$/$CaSiO_3$/g-$C_3N_4$ sample was calculated to be 57.02 meter square per gram ($m^2$ $g^{-1}$). The marked high specific surface area reflects the good dispersion of these metal oxides nanoparticles on g-$C_3N_4$. and $CaSiO_3$. Moreover, the pore size distribution curves, plotted using the Barrett-Joyner-Halenda (BJH) method, for the $CaV_2O_6$/$CaSiO_3$/g-$C_3N_4$ sample exhibited trimodal distribution with average pore diameters maximized at 4.3, 8.5, and 14.27 nm and pore volume of 0.22 cubic centimeter per gram ($cm^3$ $g^{-1}$). All the isotherms belong to the category $H_3$ type of pores, which do not exhibit limiting adsorption at high P/Po and arise due to aggregation of plate-like particles giving rise to slit-shaped pores. This indicates that the assembly of $CaV_2O_6$/$CaSiO_3$/g-$C_3N_4$ composite provoked a mesoporous array.

The cells were grown on RPMI-1640 medium supplemented with 10% inactivated fetal calf serum and 50 micrograms per milliliter (μg/mL) gentamycin. The cells were maintained at 37° C. in a humidified atmosphere with 5% $CO_2$ and were subcultured two to three times a week.

For antitumor assays, the tumor cell lines were suspended in medium at concentration $5×10^4$ cell/well in Corning 96-well tissue culture plates, then incubated for 24 hr. The tested compounds were dissolved and/or suspended in water, then added, preferably as a solution, into 96-well plates (three replicates) to achieve ten concentrations for each compound. Six vehicle controls with media were run for each 96 well plate as a control. After incubating for 24 h, the numbers of viable cells were determined by the MTT test. Briefly, the media was removed from the 96 well plate and replaced with 100 microliter (μL) of fresh culture RPMI 1640 medium without phenol red then 10 μL of the 12 millimolar (mM) MTT stock solution (5 milligrams (mg) of MTT in 1 mL of PBS) to each well including the untreated controls. The 96 well plates were then incubated at 37° C. and 5% $CO_2$ for 4 hours. An 85 μL aliquot of the media was removed from the wells, and 50 μL of dimethyl sulfoxide (DMSO) were added to each well and mixed thoroughly with the pipette and then incubated at 37° C. for 10 min. Then after, the optical density was measured at 590 nm with the microplate reader (SunRise, TECAN, Inc, USA) to determine the number of viable cells and the percentage of viability was calculated as [(ODt/ODc)]×100% where ODt is the mean optical density of wells treated with the tested sample and ODc is the mean optical density of untreated cells. The relation between surviving cells and drug concentration is plotted to get the survival curve of each tumor cell line after treatment with the specified compound. The 50% inhibitory concentration ($IC_{50}$) required to cause toxic effects in 50% of intact cells was estimated from graphic plots of the dose-response curve for each conc. using Graphpad Prism software (San Diego, CA).

Figure 4A:
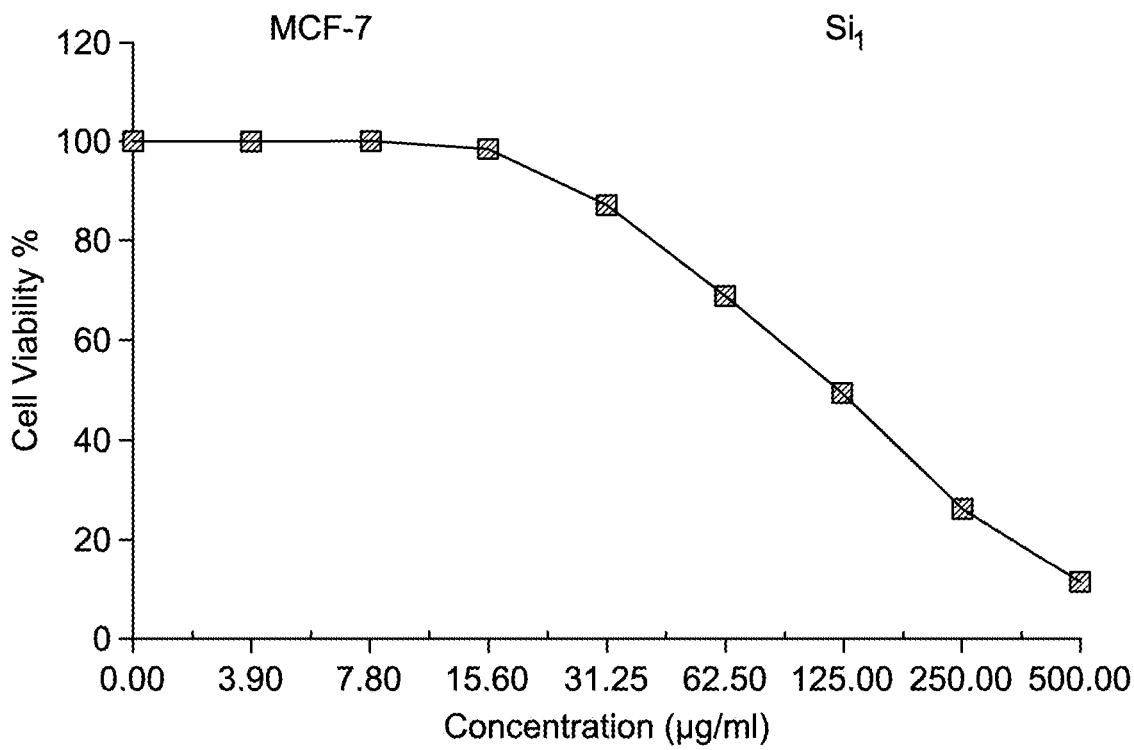
FIG. 4A depicts inhibitory activity of CaV$_2$O$_6$/CaSiO$_3$/g-C$_3$N$_4$ nanocomposite against human breast carcinoma (MCF-7) cell line, according to certain embodiments.

An in-vitro investigation was conducted for the $CaV_2O_6$/$CaSiO_3$/g-$C_3N_4$ against the Human Hepatocellular Carcinoma (HepG-2) and human Breast carcinoma cell lines (MCF-7). A concentration range of 3.0 to 500 μg/mL $CaV_2O_6$/$CaSiO_3$/g-$C_3N_4$ and the obtained results against the MCF-7 cell line is illustrated in FIG. 4A. The MCF-7 cell's viability started declining with only 15.6 μg/mL $CaV_2O_6$/$CaSiO_3$/g-$C_3N_4$ dose. The $IC_{50}$ was 122.92 μg/mL, and the maximum dose (500 μg/mL) showed 88.5% inhibition of the MCF-7.

Figure 4B:
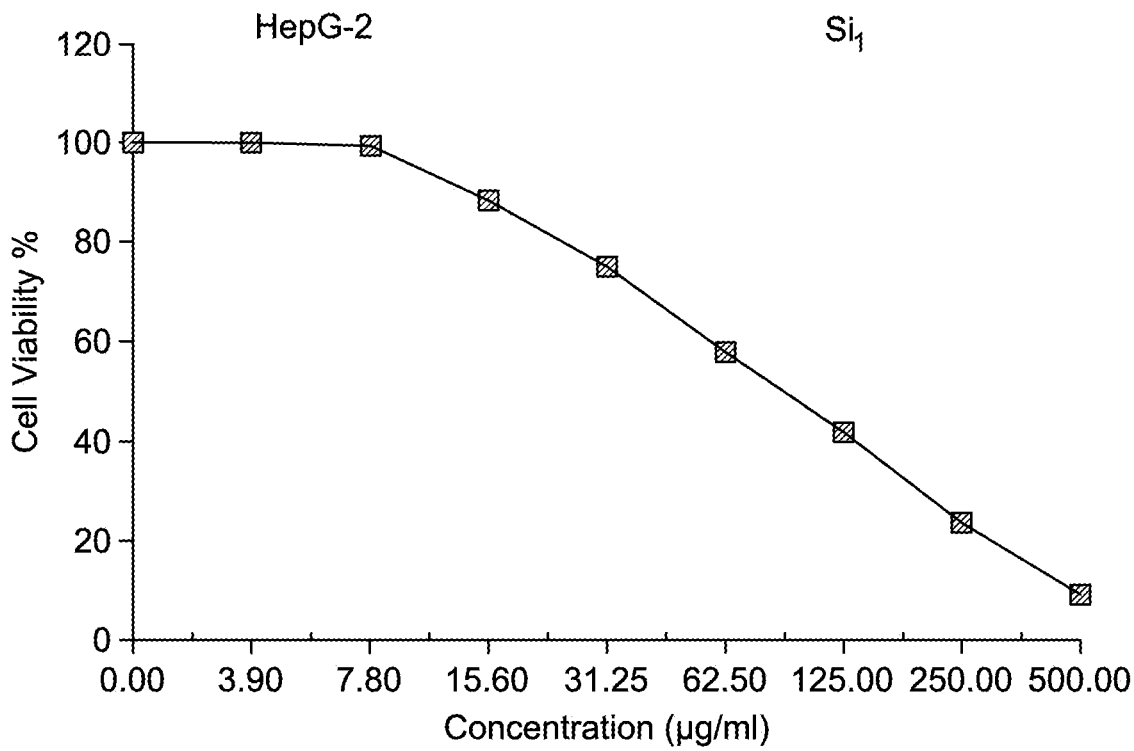
FIG. 4B depicts inhibitory activity of CaV$_2$O$_6$/CaSiO$_3$/g-C$_3$N$_4$ nanocomposite against human hepatocellular carcinoma (HepG-2) cell line, according to certain embodiments.

Furthermore, the exact concentration range of 3.0 to 500 μg/mL $CaV_2O_6$/$CaSiO_3$/g-$C_3N_4$ was applied against the HepG-2 cell line, and the obtained results against the HepG-2 cell line are illustrated in FIG. 4B. The HepG-2 cell's viability started declining with only 7.8 μg/mL $CaV_2O_6$/$CaSiO_3$/g-$C_3N_4$ dose. The IC50 was 92.58 μg/mL, and the maximum dose (500 μg/mL) showed a 91% inhibition of the HepG-2.

Numerous modifications and variations of the present disclosure are possible in light of the above teachings. It is therefore to be understood that within the scope of the appended claims, the invention may be practiced otherwise than as specifically described herein.

The invention claimed is:

1. A method of inducing apoptosis in a cancer cell, comprising:
   contacting the cancer cell with a graphite-phase carbon nitride calcium metavanadate and calcium silicate ($CaV_2O_6$/$CaSiO_3$/g-$C_3N_4$) nanocomposite to inhibit growth of the cancer cell,
   wherein the cancer cell is selected from at least one cancer cell line from the group consisting of a human hepatocellular carcinoma cell line and a human breast carcinoma cell line;
   wherein contacting the cancer cell with the $CaV_2O_6$/$CaSiO_3$/g-$C_3N_4$ nanocomposite is at a final concentration of 3 μg/mL or more; and
   wherein the contacting is at a temperature of 36° C. to 38° C. for 12 to 48 hours.

2. The method of claim 1, wherein the cancer cell is at least one selecting from the group consisting of HepG-2 cell and MCF-7 cell.

3. The method of claim 1, wherein the $CaV_2O_6$/$CaSiO_3$/g-$C_3N_4$ nanocomposite has a half-maximal inhibitory concentration ($IC_{50}$) value of 123 μg/mL or less against the MCF-7 cell.

4. The method of claim 1, wherein the cancer cell is a MCF-7 cell, and has a cell viability of 13% or less at a $CaV_2O_6/CaSiO_3/g\text{-}C_3N_4$ nanocomposite concentration of 450 to 550 µg/mL.

5. The method of claim 1, wherein the cancer cell is a MCF-7 cell, and has a cell viability of 30% or less at a $CaV_2O_6/CaSiO_3/g\text{-}C_3N_4$ nanocomposite concentration of 225 to 275 µg/mL.

6. The method of claim 1, wherein the cancer cell is a MCF-7 cell, and has a cell viability of 50% or less at a $CaV_2O_6/CaSiO_3/g\text{-}C_3N_4$ nanocomposite concentration of 110 to 140 µg/mL.

7. The method of claim 1, wherein the cancer cell is a MCF-7 cell, and has a cell viability of 70% or less at a $CaV_2O_6/CaSiO_3/g\text{-}C_3N_4$ nanocomposite concentration of 55 to 70 µg/mL.

8. The method of claim 1, wherein the cancer cell is a MCF-7 cell, and has a cell viability of 90% or less at a $CaV_2O_6/CaSiO_3/g\text{-}C_3N_4$ nanocomposite concentration of 25 to 40 µg/mL.

9. The method of claim 1, wherein the $CaV_2O_6/CaSiO_3/g\text{-}C_3N_4$ nanocomposite has a half-maximal inhibitory concentration ($IC_{50}$) value of 93 µg/mL or less against the HepG-2 cell.

10. The method of claim 1, wherein the cancer cell is a HepG-2 cell, and has a cell viability of 9% or less at a $CaV_2O_6/CaSiO_3/g\text{-}C_3N_4$ nanocomposite concentration of 450 to 550 µg/mL.

11. The method of claim 1, wherein the cancer cell is a HepG-2 cell, and has a cell viability of 25% or less at a $CaV_2O_6/CaSiO_3/g\text{-}C_3N_4$ nanocomposite concentration of 225 to 275 µg/mL.

12. The method of claim 1, wherein the cancer cell is a HepG-2 cell, and has a cell viability of 45% or less at a $CaV_2O_6/CaSiO_3/g\text{-}C_3N_4$ nanocomposite concentration of 110 to 140 µg/mL.

13. The method of claim 1, wherein the cancer cell is a HepG-2 cell, and has a cell viability of 60% or less at a $CaV_2O_6/CaSiO_3/g\text{-}C_3N_4$ nanocomposite concentration of 55 to 70 µg/mL.

14. The method of claim 1, wherein the cancer cell is a HepG-2 cell, and has a cell viability of 80% or less at a $CaV_2O_6/CaSiO_3/g\text{-}C_3N_4$ nanocomposite concentration of 25 to 40 µg/mL.

15. The method of claim 1, wherein the cancer cell is a HepG-2 cell, and has a cell viability of 90% or less at a $CaV_2O_6/CaSiO_3/g\text{-}C_3N_4$ nanocomposite concentration of 10 to 20 µg/mL.

16. The method of claim 1, wherein the $CaV_2O_6/CaSiO_3/g\text{-}C_3N_4$ nanocomposite is in the form of porous particles having a pore volume of 0.18 to 0.26 $cm^3g^{-1}$.

17. The method of claim 1, wherein the $CaV_2O_6/CaSiO_3/g\text{-}C_3N_4$ nanocomposite is in the form of porous particles having a Brunauer-Emmett-Teller (BET) surface area of 55 to 60 $m^2g^{-1}$.

18. The method of claim 1, wherein the $CaV_2O_6/CaSiO_3/g\text{-}C_3N_4$ nanocomposite is obtained by:

mixing a calcium salt and a metasilicate salt in a solvent to form a silicate product;

heating urea at 500 to 700° C. for 30 to 60 minutes to form a $g\text{-}C_3N_4$ product;

carbonizing a metavanadate salt with xylose in an aqueous acid solution to form a vanadate product; and microwaving a mixture containing the silicate product, the $g\text{-}C_3N_4$ product, and the vanadate product in an organic solvent to form the $CaV_2O_6/CaSiO_3/g\text{-}C_3N_4$ nanocomposite.

* * * * *